United States Patent
Taniguchi et al.

(10) Patent No.: US 11,597,829 B2
(45) Date of Patent: Mar. 7, 2023

(54) RESIN COMPOSITION FOR FIBER-REINFORCED COMPOSITE MATERIALS AND FIBER-REINFORCED COMPOSITE MATERIAL USING SAME

(71) Applicant: NIPPON STEEL CHEMICAL & MATERIAL CO., LTD., Tokyo (JP)

(72) Inventors: Yuichi Taniguchi, Tokyo (JP); Kyohei Kano, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 19 days.

(21) Appl. No.: 16/339,161

(22) PCT Filed: Oct. 12, 2017

(86) PCT No.: PCT/JP2017/036979
§ 371 (c)(1),
(2) Date: Apr. 3, 2019

(87) PCT Pub. No.: WO2018/070470
PCT Pub. Date: Apr. 19, 2018

(65) Prior Publication Data
US 2019/0233633 A1    Aug. 1, 2019

(30) Foreign Application Priority Data

Oct. 14, 2016    (JP) ............................. JP2016-202660

(51) Int. Cl.

| | | |
|---|---|---|
| C08L 33/08 | (2006.01) | |
| C08K 5/13 | (2006.01) | |
| C08K 5/17 | (2006.01) | |
| C08L 63/00 | (2006.01) | |
| C08L 33/10 | (2006.01) | |
| C08G 59/50 | (2006.01) | |
| C08K 5/103 | (2006.01) | |
| B29C 70/48 | (2006.01) | |
| B29C 39/10 | (2006.01) | |

(52) U.S. Cl.
CPC .............. *C08L 33/08* (2013.01); *B29C 39/10* (2013.01); *B29C 70/48* (2013.01); *C08G 59/50* (2013.01); *C08K 5/103* (2013.01); *C08K 5/13* (2013.01); *C08K 5/17* (2013.01); *C08L 33/10* (2013.01); *C08L 63/00* (2013.01); *C08L 2312/00* (2013.01)

(58) Field of Classification Search
CPC ............................. C08G 59/50; C08G 59/184
See application file for complete search history.

(56) References Cited

U.S. PATENT DOCUMENTS 5,310,770 A * 5/1994 DeGooyer ............ C08G 59/24
                                                      252/182.26
2010/0028593 A1   2/2010 Taketa et al.
2015/0203628 A1   7/2015 Grunder et al.
2015/0240025 A1   8/2015 Grunder et al.

FOREIGN PATENT DOCUMENTS

| JP | 9-208838 A | 8/1997 |
|---|---|---|
| JP | 2002-256139 A | 9/2002 |
| JP | 2002-275242 A | 9/2002 |
| JP | 2006-265434 A | 10/2006 |
| JP | 2012-211244 A | 11/2012 |
| JP | 2015-535022 A | 12/2015 |
| JP | 2015-536373 A | 12/2015 |
| JP | 2016-17110 A | 2/2016 |
| JP | 2016-98322 A | 5/2016 |
| JP | 2016-153490 A | 8/2016 |
| TW | 200902604 A | 1/2009 |

OTHER PUBLICATIONS

International Search Report (PCT/ISA/210) issued in PCT/JP2017/036979, dated Dec. 12, 2017.
Written Opinion of the International Searching Authority (PCT/ISA/237) issued in PCT/JP2017/036979, dated Dec. 12, 2017.
English translation of International Preliminary Report on Patentability and Written Opinion dated Apr. 25, 2019, in PCT/JP2017/036979 (Forms PCT/IB/338, PCT/IB/373, and PCT/ISA/237).

* cited by examiner

*Primary Examiner* — Wenwen Cai
(74) *Attorney, Agent, or Firm* — Birch, Stewart, Kolasch & Birch, LLP

(57) ABSTRACT

Provided is a resin composition that exhibits satisfactory impregnability into reinforcing fibers, while having rapid curability, and that is suitable for fiber-reinforced composite materials producing molded articles having high heat resistance. A two-pack resin composition for fiber-reinforced composite materials is configured of a base material including an epoxy resin (A) and a (meth)acrylate compound (B) having three or more (meth)acryloyl groups in a molecule, and a curing agent including an amine compound (C) represented by the following general formula (1), a mass ratio of the base material to the curing agent being within the range of from 85:15 to 65:35, Wherein the epoxy resin (A) includes 75% by mass to 100% by mass of a bisphenol A epoxy resin; the base material has a viscosity of 10,000 mPa·s or less; and the curing agent has a viscosity of 800 mPa·s or less. $X-(CH_2NH_2)_n$ (1) (In the formula, X represents an n-valent organic group having 1 to 16 carbon atom; and n represents 2 or 3).

13 Claims, No Drawings

RESIN COMPOSITION FOR FIBER-REINFORCED COMPOSITE MATERIALS AND FIBER-REINFORCED COMPOSITE MATERIAL USING SAME

TECHNICAL FIELD

The present invention pertains to a matrix resin material for a fiber-reinforced composite material which is a resin composition excellent in low viscosity and curability in a short time and which makes it possible to obtain a molded article having high heat resistance at the time of curing, and also pertains to a molding method for the matrix resin material.

BACKGROUND ART

Fiber-reinforced composite materials are generally configured of reinforcing fibers such as glass fibers, aramid fibers, carbon fibers and the like and a thermally curable matrix resin such as an unsaturated polyester resin, a vinyl ester resin, an epoxy resin, a phenolic resin, a benzoxazine resin, a cyanate resin, a bismaleimide resin and the like. Since such composite materials are lightweight and excellent in mechanical properties such as strength, corrosion resistance, fatigue resistance and the like, they are widely used as structural materials for aircrafts, automobiles, civil engineering, sporting goods and the like.

Examples of methods for producing a fiber-reinforced composite material include an autoclave molding method or a press molding method using a prepreg obtained by impregnating reinforcing fibers in advance with a thermally curable matrix resin, a resin transfer molding method including a step of impregnating reinforcing fibers with a liquid matrix resin and a step of molding by thermal curing, a liquid compression molding method, a wet layup molding method, a pultrusion molding method, a filament winding molding method, and the like. Among them, a molding method such as a resin transfer method, in which impregnation and molding are carried out without using a prepreg, a low-viscosity matrix resin Is used in order to promptly impregnate the reinforcing fibers with the resin.

In addition, among the aforementioned methods, the resin transfer molding method and liquid compression molding method require a matrix resin having a high curing rate after impregnating reinforcing fibers with the resin in order to ensure high productivity.

Conventionally, thermally curable resins such as unsaturated polyester resins, vinyl ester resins, urethane resins, epoxy resins and the like have been used in the resin transfer molding method and liquid compression molding method. Although radically-polymerizable unsaturated polyester resins and vinyl ester resins are low in viscosity and excellent in rapid curability, a problem associated with such resins is that they have a large curing shrinkage at the time of molding, and mechanical properties such as heat resistance, strength and toughness of molded articles are relatively low. Although urethane resins are excellent in rapid curability and a molded article with high strength and toughness can be obtained, a problem associated with such resins is that the molded article has low heat resistance and high water absorption ratio. Although epoxy resins can provide molded articles with high heat resistance, strength and toughness, a problem is that resin viscosity is relatively high.

When an epoxy resin is used as a matrix resin of a fiber-reinforced composite material, a bisphenol A epoxy resin is generally used because of excellent cost-efficiency and physical properties, but a low-viscosity bisphenol F epoxy resin is also used in order to improve fiber impregnability.

PTL 1 suggests a low-viscosity resin composition for a fiber-reinforced composite material using a bisphenol F epoxy resin. However, the bisphenol F epoxy resin provides a cured product having a glass transition temperature lower than that of the bisphenol A epoxy resin and is, therefore, undesirable in applications requiring heat resistance.

PTL 2, 3 and 4 suggest resin compositions including an epoxy resin, a polyfunctional acrylate compound and a curing agent in order to achieve low viscosity and curability at low temperatures. However, the inventions disclosed therein pertains to applications of concrete repairing materials and adhesives, and the compositions have a low glass transition temperature and insufficient heat resistance.

In PTL 5, although efforts have been made to impart rapid curability to a resin composition by a combination of an epoxy resin and a specific phenol compound, the time to gelation is still long and the rapid curability is insufficient.

In PTL 6 and 7, efforts have been made to impart rapid curability by adding a specific catalyst to a resin composition composed of an epoxy resin and polyethylene polyamine. However, since bisphenol A epoxy resin is used as the base material, there is a problem that the viscosity of the base material is high.

Regarding a matrix resin for a fiber-reinforced composite material, although attempts have been made to improve impregnability and rapid curability of a molded article by lowering the viscosity of the resin composition, in addition thereto, further improvements in heat resistance of molded articles are desired.

CITATION LIST

Patent Literature

[PTL 1] Japanese Patent Application Publication No. 2006-265434
[PTL 2] Japanese Patent Application Publication No. 2002-256139
[PTL 3] Japanese Patent Application Publication No. 2002-275242
[PTL 4] Japanese Patent Application Publication No. 2012-211244
[PTL 5] Japanese Patent Application Publication No. 2016-098322
[PTL 6] Japanese Translation of PCT Application No. 2015-535022
[PTL 7] Japanese Translation of PCT Application No. 2015-536373

SUMMARY OF INVENTION

The present invention has an object to provide a resin composition that exhibits satisfactory impregnability into reinforcing fibers as a result of lowering the viscosity of the resin composition by lowering the viscosity of the base material, has rapid curability, and ensures high heat resistance of a molded article obtained by curing. The present invention has another object to provide a resin composition that makes it possible to obtain a fiber-reinforced composite material with high productivity.

As a result of studies conducted to solve the aforementioned problems, the inventors of the present invention have found that a molded article having high heat resistance can be obtained by using specific epoxy resin, acrylate compound and amine compound, and to thereby solve the above problems. The present invention has been accomplished on the basis of this finding.

That is, the present invention provides a two-pack resin composition for fiber-reinforced composite materials configured of a base material including an epoxy resin (A) and a (meth)acrylate compound (B) having three or more (meth) acryloyl groups in a molecule, and a curing agent including an amine compound (C) represented by a following general formula (1), a mass ratio of the base material to the curing agent being within the range of from 85:15 to 65:35, wherein the epoxy resin (A) includes 75% by mass to 100% by mass of a bisphenol A epoxy resin; the base material has a viscosity at 25° C. of 10,000 mPa·s or less as measured by an E-type viscometer; and the curing agent has a viscosity at 25° C. of 800 mPa·s or less as measured by an E-type viscometer.

(in the formula, X represents an n-valent organic group having 1 to 16 carbon atoms; and n represents 2 or 3.)

The X hereinabove may be an n-valent hydrocarbon group having an alicyclic structure having 6 or more carbon atoms, an n-valent hydrocarbon group having an aromatic ring structure, or an aliphatic hydrocarbon group, and the alicyclic structure or the aliphatic hydrocarbon group may have a secondary amine structure inside thereof.

Preferred amine compounds (C) are diamines represented by the following formula (2) or (3).

[C1]

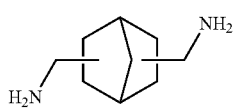

(2)

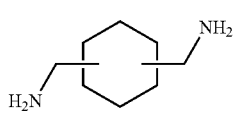

(3)

In the present invention, the (meth)acrylate compound (B) is at least one selected from trimethylolpropane tri(meth)acrylate, ditrimethylolpropane tetra(meth)acrylate, pentaerythritol tetra(meth)acrylate, and dipentaorythritol hexa(meth)acrylate.

In the present invention, the mass ratio of the epoxy resin (A) and the (meth)acrylate compound (B) in the base material is preferably within the range of from 96:4 to 70:30.

In the present invention, the base material including the epoxy resin (A) and the (meth)acrylate compound (B) has a viscosity increase ratio of 16% or less after 24 hour-lapse at 60° C. under a vacuum degree of 1.0 kPa.

In the present invention, it is preferable that a cured product obtained by curing the resin composition for fiber-reinforced composite materials by heating at 130° C. for 5 min have a glass transition temperature of 110° C. or higher.

Another aspect of the present invention pertains to a fiber-reinforced composite material in which reinforcing fibers are blended in the resin composition for fiber-reinforced composite materials. In this case, the volume amount of the reinforcing fibers is preferably 45% to 70%. Still another aspect of the present Invention pertains to a cured product of the fiber-reinforced composite material. Further aspect of the present invention pertains to a method for manufacturing a molded body by molding the fiber-reinforced composite material by a resin transfer molding method or a liquid compression molding method.

Another aspect of the present invention pertains to a method for manufacturing a molded body Including the steps of: preparing a base material chat includes an epoxy resin (A) including 75% by mass to 100% by mass of a bisphenol A epoxy resin and a (meth)acrylate compound (BJ having three or more (meth)acryloyl groups in a molecule, and has a viscosity at 25° C. of 10,000 mPa·s or less as measured by an E-type viscometer, and a curing agent including an amine compound (C) represented by the general formula (1) above; heating the base material to 50° C. to 90° C., heating the curing agent to 20° C. to 60° C., and configuring a two-pack resin composition for fiber-reinforced composite materials such that the mass ratio of the base material and the curing agent is within the range of from 85:15 to 65:35; blending reinforcing fibers therein to obtain a fiber-reinforced composite material; and thermally curing and molding the fiber-reinforced composite material in a die.

DESCRIPTION OF EMBODIMENTS

Embodiments of the present invention will be described hereinbelow in detail.

The resin composition for fiber-reinforced composite materials of the present invention is a two-pack resin composition for fiber-reinforced composite materials configured of a base material including an epoxy resin (A) and a (meth)acrylate compound (B) having three or more (meth) acryloyl groups in a molecule, and a curing agent including an amine compound (C) represented by the general formula (1). The epoxy resin (A), the (meth)acrylate compound (B) having three or more (meth)acryloyl groups in one molecule, and the amine compound (C) will be also referred to herein as component (A), component (B), and component (C), respectively.

It is necessary that 75% by mass to 100% by mass of the epoxy resin (A) used as the component (A) be a bisphenol A epoxy resin. By using the bisphenol A epoxy resin, it is possible to enhance the thermal stability of the base material and reduce the viscosity by heating. Further, the molded body obtained by thermal curing has excellent heat resistance. Meanwhile, when a bisphenol F epoxy resin is used as a main component, although the viscosity can be lowered, the heat resistance of the obtained molded body is lowered. When a phenol novolac epoxy resin is used, the heat resistance of the molded body can be enhanced, but since the viscosity increases, impregnability into the reinforcing fibers is impaired.

The epoxy resin (A) used in the present invention may include another epoxy resin as long as the amount thereof is less than 25% by mass and the viscosity of the base material does not increase. Preferably, the other epoxy resin is a compound having two or more epoxy groups in a molecule, and examples thereof include bisphenol epoxy resins such as bisphenol F epoxy resin, bisphenol E epoxy resin, bisphenol S epoxy resin, bisphenol Z epoxy resin, isophorone bisphenol epoxy resin, and the like; halogen or alkyl substitution and hydrogenation products, high molecular-weight materials having not only monomers but also a plurality of repeating units, and glycidyl ethers of alkylene oxide adducts of these bisphenol epoxy resins; novolac epoxy resins such as phenol novolac epoxy resin, cresol novolac epoxy resin, bisphenol A novolac epoxy resin, and the like; alicyclic epoxy resins such as 3,4-epoxy-6-methylcyclohexylmethyl-3,4-epoxy-6-methylcyclohexane carboxylate, 3,4-epoxycyclohexylmethyl-3,4-epoxycyclohexane carboxylate, 1-epoxyethyl-3,4-epoxycyclohexane, and the like; aliphatic epoxy resins such as trimethylolpropane polyglycidyl ether, pentaerythritol polyglycidyl ether and polyoxyalkylene diglycidyl ether, and the like; glycidyl esters such as phthalic acid diglycidyl ester, tetrahydrophthalic acid diglycidyl ester, dimer acid glycidyl ester and the like; glycidyl amines such as tetraglycidyl diamino diphenyl methane, tetraglycidyl diamino diphenyl sulfone, triglycidyl aminophenol, triglycidyl aminocresol, tetraglycidyl xylylene diamine and the like. These resins may be used singly or in combination of two or more thereof.

Among these epoxy resins, from the viewpoint of viscosity, an epoxy resin having two or more epoxy groups in a molecule and a viscosity at 25° C. of not more than 30,000 mPa·s, as measured by an E-type viscometer, is preferable.

The (meth)acrylate compound (B) used in the present invention has three or more (meth)acryloyl groups as functional groups in a molecule. Where the number of functional groups in a molecule is less than 2, the heat resistance of the molded article obtained at the time of thermal curing decreases followed by the decrease in crosslinking density.

It is preferable that the (meth)acrylate compound (B) have a viscosity at 50° C. of 1000 mPa·s or less as measured by an E-type viscometer, because the viscosity of the base material can be reduced.

The (meth)acrylate compound (B) refers to a compound having three or more acryloyl groups ($CH_2$=CHCO—) or methacryloyl groups ($CH_2$=C($CH_3$)CO—). However, 10% or less of a compound having two or less (meth)acryloyl groups in a molecule may be included in addition to the (meth)acrylate compound (B).

The (meth)acrylate compound (B) substantially does not contain an acid group such as a carboxyl group, a phosphoric acid group, a sulfonic acid group or the like. Since these acid groups have reactivity with an epoxy group even at room temperature, the viscosity increase ratio of the molecular weight is increased at the time of mixing with the epoxy resin, impairing stable impregnability into the fibers. For the same reasons, it is desirable that the compound does not have a group (OH group, $NH_2$ group and the like) reactive with an epoxy group. For example, it is desirable that the hydroxyl value does not exceed 10 mg KOH/g.

Specific examples of the (meth)acrylate compound (B) include acrylate or methacrylate compounds of a polyol such as glycerin, trimethylolpropane, ditrimethylolpropane, pentaerythritol, dipentaerythritol and the like. Other examples include acrylate or methacrylate compounds of a polyol having a molecular weight increased by adding ethylene oxide or propylene oxide in an amount of 2 mol or more to 1 mol of a polyol such as glycerin, trimethylolpropane, ditrimethylolpropane, pentaerythritol, dipentaerythritol or the like. Two or more such compounds may be used as necessary.

More specifically, trimethylolpropane tri(meth)acrylate, ditrimethylolpropane tetra(meth)acrylate, pentaerythritol tetra(meth)acrylate, dipentaerythritol hexa(meth)acrylate and the like are preferably used.

The compounding ratio (A:B mass ratio) of the epoxy resin (A) and the (meth)acrylate compound (B) is preferably in the range of 96:4 to 70:30. Where the compounding ratio of the epoxy resin exceeds 96, the viscosity becomes too high, sufficient impregnation is not performed, and the rapid curability is lowered. Meanwhile, when the compounding ratio is less than 70, the heat resistance is lowered.

The base material preferably has a viscosity at 25° C. of 10,000 mPa·s or less, and more preferably 8000 mPa·s or less as measured by an E-type viscometer. Further, it is preferable that the viscosity increase ratio after 24 hour-lapse at 80° C. be within 16%, and more preferably within 8%. When the viscosity exceeds 10,000 mPa·s, it becomes difficult to sufficiently impregnate the reinforcing fibers and the difference in viscosity with the curing agent becomes large, so that uniform mixing is difficult. It is undesirable that the viscosity increase ratio exceed 16%, because when a tank that stores the base material is warmed to carry out injection and impregnation at a lower viscosity, there is a significant increase in viscosity, molding defects occur, continuous production stability is deteriorated, and solidification occurs in the tank. The lower limit of the viscosity is not particularly restricted, and lower viscosity is preferred because injection and impregnation of the composition at the time of molding are facilitated.

A polymerization inhibitor can be used for the base material in order to enhance thermal stability thereof. Examples of suitable polymerization inhibitors include hydroquinone, methylhydroquinone, p-t-butylcatechol, 2-t-butylhydroquinone, 2,5-di-t-butylhydroquinone, trimethylhydroquinone, methoxyhydroquinone, p-benzoquinone, 2,5-di-t-butylbenzoquinone, naphthoquinone, 4-methoxy-1-naphthol, phenothiazine, N-oxyl compounds and the like. The amount of the polymerization inhibitor is preferably 0.0005 parts by mass to 0.5 parts by mass, particularly preferably 0.001 parts by mass to 0.1 part by mass per 100 parts by mass of the (meth)acryl compound (B).

The amine compound (C) used in the present invention is represented by the following general formula (1).

$$X—(CH_2NH_2)_n \quad (1)$$

(In the formula, X represents an n-valent organic group having 1 to 16 carbon atoms; and n represents 2 or 3.)

The amine compound (C) has 2 or 3 aminomethyl groups in a molecule. The aminomethyl group has high reactivity with an epoxy group and an acryloyl group and ensures rapid curability. Further, by having two or more aminomethyl groups in a molecule, a molded article having high crosslinking density at the time of thermal curing and excellent heat resistance can be obtained.

Specific examples of the amine compound (C) include noncyclic aliphatic polyamines such as iminobispropylamine having a secondary amine represented by a formula (4) in the molecular structure, triethylenetetramine, bis(hexamethylene)triamine and the like, cyclic aliphatic polyamines such as bis(aminomethyl)cyclohexane, 1,3,6-trisaminomethylcyclohexane, 3,9-bis(3-aminopropyl)-2,4,8,10-tetraoxaspiro(5.5)undecane, bis(aminomethyl)norbornane, and the like, polyamines including an aromatic ring such as metaxylylenediamine (MXDA) and the like, and derivatives obtained by substituting an alkyl group in these alicyclic or aromatic rings.

[C2]

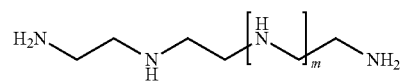

(4)

Among them, bis(aminomethyl)norbornane represented by the following, formula (2) and bis(aminomethyl)cyclohexane represented by the following formula (3) are particularly preferable in terms of flowability, rapid curability, and heat resistance.

[C3]

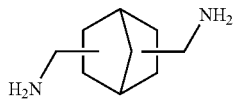
(2)

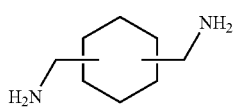
(3)

The curing agent includes the amino compound (C) as a curing agent for epoxy resin. It is preferable that the amino compound (C) be contained in an amount of 70% by mass or more, and it is preferable that other curing agents for epoxy resin be not included, but other, curing agents may be blended as long as the amount thereof is less than 30% by mass. Examples of other curing agents for epoxy resins which can be blended in addition to the component (C) include phenol-based and thiol-based curing agents for epoxy resins. In addition, a curing accelerator, a viscosity modifier, an internal release agents, and the like can be included.

The phenol-based curing agent to be used as the other curing agent for epoxy resins is not particularly limited, and suitable examples thereof include bisphenol A, bisphenol F, substituted or unsubstituted biphenol, a phenol novolac resin, a triazine skeleton-containing phenol novolac resin, a naphthol novolac resin, a naphthol aralkyl resin, a triazine skeleton-containing naphthol resin, a biphenyl aralkyl phenol resin and the like. The phenol-based curing agents may be used singly or in combination of two or more thereof.

In addition to the amino compound (C) and other curing agents for epoxy resins, the curing agent may include the following curing catalysts or curing accelerators to accelerate the curing reaction: tertiary amines, carboxylic acids, Lewis acid complexes, onium salts, imidazoles, alcohols, and phenol compounds such as phenols, cresols, allylphenol, nitrophenol, para-aminophenol, meta-aminophenol, mono-t-butylphenol, di-t-butylphenol, hydroquinone, methylhydroquinone, dimethylhydroquinone, trimethylhydroquinone, tetramethylhydroquinone, isopropylhydroquinone, methylisopropylhydroquinone, mono-t-butylhydroquinone, di-t-butylhydroquinone, mono-t-amylhydroquinone, di-t-amylhydroquinone, nitrohydroquinone, phenylhydroquinone, diphenylhydroquinone, chlorohydroquinone, dichlorohydroquinone, trichlorohydroquinone, tetrachlorohydroquinone, bromohydroquinone, dibromohydroquinone, tribromohydroquinone, tetrabromohydroquinone, catechol, t-butyl catechol, resorcinol, pyrogallol, dinitropyrogallol, 1,2,4-benzenetriol and the like. These curing accelerators may be used singly or in combination of two or more thereof.

The curing agent including the amine compound (C) has a viscosity at 25° C. of 800 mPa·s or less, preferably 400 mPa·s or less as measured by an E-type viscometer. When the viscosity exceeds 800 mPa·s, it becomes difficult to sufficiently impregnate the reinforcing fibers. The lower limit of the viscosity is not particularly restricted, and lower viscosity is preferred because injection and impregnation of the composition at the time of molding are facilitated.

The resin composition of the present invention is a two-pack curable composition including a base material and a curing agent, wherein the base material including the epoxy resin (A) and the (meth)acrylate compound (B) and the curing agent including the amine compound (C) represented by the general formula (1) are mixed at a predetermined ratio, thereby enabling thermal curing. The mixing ratio of the base material and the curing agent is determined by the types of the epoxy resin (A) and the amine compound (C) to be used. Specifically, the ratio of the number of epoxy groups contained in the entire epoxy resin in the component (A) and the number of active hydrogen contained in the entire amine compound in the component (C) is calculated and adjusted to obtain a mass ratio of the base material and the curing agent within the range of 85:15 to 65:35, and preferably 83:17 to 73:27. Where the mass ratio is out of the range, there is a possibility that the heat resistance and elastic modulus of the obtained cured resin product are lowered.

Further, it is preferable to add a radically-polymerizable initiator (D) to the curing agent in order to accelerate the polymerization of the component (B). An azo compound which generates radicals on heating or organic peroxidation can be used as the radically-polymerizable initiator (D). Examples thereof include 2,2'-azobisisobutyronltrile, 1,1'-azobis(cyclohexane-1-carbonitrile), methyl ethyl ketone peroxide, methylcyclohexanone peroxide, methylacetoacetate peroxide, acetylacetone peroxide, 1,1-bis(t-butylperoxy) 3,3,5-trimethylcyclohexane, 1,1-bis(t-hexylperoxy)cyclohexane, 1,1-bis(t-hexylperoxy) 3,3,5-trimethylcyclohexane, 1,1-bis(t-butylperoxy)cyclohexane, 2,2-bis(4,4-di-t-butylperoxycyclohexyl)propane, 1,1-bis(t-butylperoxy)cyclododecane, n-butyl 4,4-bis(t-butylperoxy) valerate, 2,2-bis(t-butylperoxy)butane, 1,1-bis(t-butylperoxy)-2-methylcyclohexane, t-butyl hydroperoxide, P-menthane hydroperoxide, 1,1,3,3-tetramethylbutyl hydroperoxide, t-hexyl hydroperoxide, dicumyl peroxide, 2,5-dimethyl-2,5-bis(t-butylperoxy)hexane, α,α'-bis(t-butylperoxy)diisopropylbenzene, t-butylcumyl peroxide, di-t-butyl peroxide, 2,5-dimethyl-2,5-bis(t-butylperoxy) hexyne-3, isobutyryl peroxide, 3,5,5-trimethylhexanoyl peroxide, octanoyl peroxide, lauroyl peroxide, cinnamic acid peroxide, m-toluoyl peroxide, benzoyl peroxide, diisopropyl peroxydicarbonate, bis(4-t-butylcyclohexyl) peroxydicarbonate di-3-methoxybutylperoxy dicarbonate, di-2-ethylhexyl peroxydicarbonate, di-sec-butyl peroxydicarbonate, di(3-methyl-3-methoxybutyl) peroxydicarbonate, di(4-t-butylcyclohexyl) peroxydicarbonate, α,α'-bis(neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 2,5-dimethyl-2,5-bis(2-ethylhexanoylperoxy)hexane, 1,1,3,3-tetramethylbutyl peroxy-2-ethylhexanoate, 1-cyclohexyl-1-methylethylperoxy-2-ethylhexanoate, t-hexyl peroxy-2-ethylhexanoate, t-butyl peroxy-2-ethylhexanoate, t-butyl peroxyisobutyrate, t-butyl peroxy maleic acid, t-butyl peroxylaurate, t-butyl peroxy-3,5,5-trimethylhexanoate, t-butyl peroxyisopropyl monocarbonate, t-butyl peroxy-2-ethylhexyl monocarbonate, 2,5-dimethyl-2,5-bis(benzoylperoxy) hexane, t-butyl peroxyacetate, t-hexyl peroxybenzoate, t-butyl peroxy-m-toluoylbenzoate, t-butyl peroxybenzoate, bis(t-butylperoxy) isophthalate, t-butyl peroxyallylmonocarbonate, 3,3',4,4'-tetra (t-butylperoxycarbonyl)benzophenone and the like. In particular, the radically-polymerizable initiator (D) which is preferable for obtaining the effect of the present invention is a compound having a half-life temperature of 120° C. to 160° C. for 10 h, and more preferably a compound having a half-life temperature of 120° C. to 140° C. By using such a compound, the rapid curability at the time of mixing is improved, and a molded article excellent in heat resistance and toughness at the time of thermal curing can be obtained.

The amount of the radically-polymerizable initiator (D) to be used is preferably 0.005 parts by mass to 5.0 parts by mass, in particular 0.1 parts by mass to 2.0 parts by mass, with respect to 100 parts by mass of the (meth)acrylate compound (B). When the addition amount is less than 0.005 parts by mass, the curing rate of the radically-polymerizable monomer decreases, the productivity decreases, and in some cases the curing becomes insufficient, so that the heat resistance and toughness of the molded article are impaired. When the addition amount exceeds 5.0 parts by mass, the curing rate of the radically-polymerizable monomer becomes too high and the resin composition becomes high in the viscosity increase ratio, impairing the stable impregnability into the fibers. Further, the initiator is added to the curing agent.

A plasticizer, a dye, an organic pigment, an inorganic filler, a polymer compound, a coupling agent, a surfactant, a solvent, and the like can be appropriately blended as the other components with the base material and the curing agent. Other curable resins can also be blended. Examples of such curable resins include unsaturated polyester resins, curable acrylic resins, curable amino resins, curable melamine resins, curable urea resins, curable cyanate ester resins, curable urethane resins, curable oxetane resins, curable epoxy/oxetane composite resin and the like, and these examples are not limiting.

These resins can be blended with either of the base materials and the curing agent, depending on the reactivity with the components contained therein, viscosity and the like. Blends in which reaction proceeds with the components contained in the base material or curing agent need to be avoided.

The reinforcing fibers to be used for the fiber-reinforced composite material of the present invention are selected from glass fibers, aramid fibers, carbon fibers, boron fibers and the like, but in order to obtain a fiber-reinforced composite material having excellent strength, carbon fibers are preferably used.

The volume content ratio of the reinforcing fibers in the fiber-reinforced composite material obtained from the resin composition for fiber-reinforced composite materials of the present invention and the reinforcing fibers is preferably in the range of 45% to 70%, and more preferably in the range of 48% to 62%. Within this range, a molded body having fewer voids and a high volume content ratio of reinforcing fibers can be obtained, so that a molded material with excellent strength can be obtained.

Since the resin composition for fiber-reinforced composite materials of the present invention is a two-pack material including the base material and the curing agent, the base material and the curing agent are stored in separate tanks or the like, and the two are mixed at the time of use. Curing of the resin composition for fiber-reinforced composite materials can be carried out by injecting the base material having a temperature in the range of 50° C. to 90° C. and the curing agent having a temperature in the range of 20° C. to 60° C. into a molding die or the like in which fibers are previously arranged, and thermally curing at a temperature of 90° C. to 160° C., preferably 100° C. to 140° C., for a time of 15 sec to 360 sec, preferably 25 sec to 150 sec. The base material and the curing agent may be injected at the same time, but in order to improve uniformity, it is preferable to mix the two just before the injection and then inject into a molding die or the like in which the fibers are arranged. The mixing may be carried out in the presence of fibers.

A low injection temperature is undesirable because flowability decreases and the molding die and fibers are not filled satisfactorily. A high injection temperature is also undesirable because burrs are generated, or curing of the resin starts at the time of injection, so that the resin is cured in the tank or in the molding die and filling defects occur. Furthermore, it is undesirable that the molding time be too short because sufficient filling cannot be achieved, or too long because the resin is cured in the mold, molding defects occur and productivity decreases. The resin composition for fiber-reinforced composite materials of the present invention can be injected into a molding die for impregnation at a relatively low injection temperature as described above, and a cured product that can be released from the molding die in a short curing time can be obtained.

The cured product of the resin composition for fiber-reinforced composite materials of the present invention has a glass transition temperature (Tg) of preferably 100° C. or higher, and more preferably 110° C. or higher. When the Tg is lower than 100° C., the obtained fiber-reinforced composite material is likely to be deformed when released from the mold.

A method for preparing a fiber-reinforced composite material from the resin composition of the present invention is not particularly limited, but an RTM (Resin Transfer Molding) method or an LCM (Liquid Compression Molding) method are suitable therefor. In the RTM method, a fiber material or a preform made of reinforcing fibers is placed in a molding die, a liquid resin composition for fiber-reinforced composite materials is injected into the molding die and impregnated into reinforcing fibers to obtain a fiber-reinforced composite material, and then heating is performed to cure the fiber-reinforced composite material and obtain a molded body. As the curing conditions, the conditions described in relation to the curing of the resin composition for fiber-reinforced composite materials are suitable. In the LCM method, a fiber material or a preform made of reinforcing fibers which has been blended with a resin in advance is set in a molding die in a state in which the molding pressure is released, the impregnation and molding are simultaneously performed by clamping the molding die to obtain a reinforced composite, material, and the molding die is thereafter heated to cure the fiber-reinforced composite material and obtain a molded body.

EXAMPLES

Next, the present invention will be specifically described based on examples, but the present invention is not limited to the following examples, provided that the gist of the present invention is not impaired. Unless otherwise specified, the parts indicating the blended amount are parts by mass.

Abbreviations of the respective components used in the examples are as follows.

YD-128: bisphenol A epoxy resin (manufactured by Nippon Steel & Sumikin Chemical Co., Ltd., viscosity (25° C.) 12,000 mPa·s)

YDF-170: bisphenol F epoxy resin (manufactured by Nippon Steel & Sumikin Chemical Co., Ltd., viscosity (25° C.) 2500 mPa·s)
YDPN-6300: phenol novolac epoxy resin (manufactured by Nippon Steel & Sumikin Chemical Co., Ltd.)
TMPTA: trimethylolpropane triacrylate (viscosity (50° C.) 19 mPa·s)
DTMPTA: ditrimethylolpropane tetraacrylate (viscosity (50° C.) 55 mPa·s)
PETTA: pentaerythritol tetraacrylate (viscosity (50° C.) 130 mPa·s)
PETA: pentaerythritol triacrylate (viscosity (25° C.) 180 to 800 mPa·s)
DPETTA: dipentaerythritol hexaacrylate (viscosity (50° C.) 940 mPa·s)
PEGDA: polyethylene glycol diacrylate (viscosity (25° C.) 13 mPa·s)
TETA: triethylenetetramine
CDA: bis(aminomethyl)cyclohexahe
NBDA: bis(aminomethyl)norbornane
IPDA: isophoronediamine
PACM: 4,4-methylenebis(cyclohexylamine)

Methods for measuring and testing physical properties are described hereinbelow.

(Measurement of Base Material Viscosity, Curing Agent Viscosity, and Base Material Viscosity Increase Ratio)

The viscosity of the base material and the curing agent before mixing was measured at 25° C. by using an E-type viscometer of a cone plate type (manufactured by Toki Sangyo Co., Ltd.: RE80H). The value after the lapse of 60 sec from the start of the measurement was taken as the initial viscosity value.

Further, the base material was placed in a vacuum oven heated to 60° C. and allowed to stand at a degree of vacuum of 1.0 kPa for 24 h, and the viscosity was similarly measured using the E-type viscometer. The value after the lapse of 60 sec from the start of the measurement was taken as the value of viscosity after 24 h. Then, the viscosity increase ratio of the base material was calculated using the following formula.

Viscosity increase ratio of base material=100×(viscosity after 24 h/initial viscosity)−100.

(Measurement of Gel Time)

The resin composition was added on a plate of a gelation tester (manufactured by Nissin Kagaku Kenkyusho Co., Ltd.) heated to 120° C., and stirring was carried out at a rate of 2 revolutions per second by using a fluororesin rod to advance curing of the resin composition. The time required until the plasticity was lost was taken as the gelation time.

(Measurement of Glass Transition Temperature)

Using a dynamic viscoelasticity tester, the measurement was performed on a test piece for glass transition temperature measurement under conditions of a heating rate of 5° C./min, a bending mode, and a measuring frequency of 10 Hz, and the maximum value of a loss elastic modulus (E″) was taken as a glass transition temperature.

Example 1

A total of 95 parts of YB-128 as the component (A) and 5 parts of TETTA as the component (B) were placed in a 150 mL polymer container and mixed under stirring at room temperature for 5 min by using a vacuum mixer "AWATORI RENTARO (THINKY MIXER)" (THINKY Corp.) to obtain a base material. A total of 21.8 parts of NBDA as the component (C) and 2.2 parts of resorcinol were placed in a 153 mL polymer container and mixed using a vacuum mixer while stirring at room temperature for 5 min to obtain a curing agent.

The obtained base material and curing agent were cooled to a temperature equal to or less than 10° C., and then 50 parts of the base material and 12 parts of the curing agent were placed in a 150 mL polymer container and stirred using a vacuum mixer at room temperature for 20 sec to obtain a resin composition for fiber-reinforced composite materials.

This resin composition for fiber-reinforced composite materials was poured into a die having a length of 60 mm and a width of 80 mm and provided with a 4 mm thick spacer hollowed out into a flat plate shape, cured at 130° C. for 5 min, cut to a size of 50 mm×10 mm by using a table band saw and used for measurement of the glass transition temperature.

Examples 2 to 10 and Comparative Examples 1 to 6 Resin compositions for fiber-reinforced composite materials were prepared under the same mixing conditions as in Example 1 except that the raw materials were used as the components (A) to (C) in the compositions listed in Table 1 and Table 2. In addition, test pieces for measuring the glass transition temperature were prepared by the same molding method as in Example 1.

The test results of Examples and Comparative Examples are shown in Tables 1 and 2, respectively.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| (A) | YD-128 | 95 | 80 | 64 | 80 | 80 | 80 | 80 | 95 | 95 | 95 |
| | YDF-170 | | | | | | | | | | |
| | YDPN-6300 | | | 16 | | | | | | | |
| (B) | PETTA | 5 | 20 | 20 | | | | | 5 | 5 | 5 |
| | DTMPTA | | | | 20 | | | | | | |
| | TMPTA | | | | | 20 | | | | | |
| | DPETTA | | | | | | 20 | | | | |
| | PETA | | | | | | | 20 | | | |
| | PEGDA | | | | | | | | | | |
| (C) | NBDA | 21.8 | 25.2 | 25.5 | 23.1 | 24.3 | 24.5 | 24.3 | | | 24.2 |
| | CDA | | | | | | | | 20.0 | | |
| | TETA | | | | | | | | | 13.8 | |
| | IPDA | | | | | | | | | | |
| | PACM | | | | | | | | | | |
| Other | Resorcinol | 2.2 | 2.5 | 2.6 | 2.3 | 2.4 | 2.5 | 2.4 | 2.0 | 1.4 | |
| | 4-tert-Butylphenol | | | | | | | | | | 2.4 |

TABLE 1-continued

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Physical properties | Viscosity of base material (mPa/s) | 9980 | 5063 | 8846 | 4010 | 1050 | 9100 | 3150 | 9980 | 9980 | 9980 |
| | Viscosity of curing agent (mPa/s) | 20 | 20 | 20 | 20 | 20 | 20 | 20 | 9 | 19 | 20 |
| | Viscosity increase ratio of base material (%) | 0 | 0 | 5 | 0 | 0 | 0 | 0 | 0 | 0 | 0 |
| | Gelling time at 120° C. (s) | 72 | 33 | 29 | 45 | 59 | 26 | 62 | 85 | 93 | 48 |
| | Tg (° C.) | 141 | 140 | 145 | 128 | 121 | 142 | 122 | 137 | 112 | 129 |

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| (A) | YD-128 | 100 | 80 | 95 | 95 | | |
| | YDF-170 | | | | | 100 | |
| | YDPN-6300 | | | | | | 80 |
| (B) | PETTA | | | 5 | 5 | | 20 |
| | DTMPTA | | | | | | |
| | TMPTA | | | | | | |
| | DPETTA | | | | | | |
| | PETA | | | | | | |
| | PEGDA | | 20 | | | | |
| (C) | NBDA | 20.6 | 21.5 | | | 23.1 | 27.2 |
| | CDA | | | | | | |
| | TETA | | | | | | |
| | IPDA | | | 24.0 | | | |
| | PACM | | | | 29.6 | | |
| Other | Resorcinol | 2.1 | 2.2 | 2.4 | 3.0 | 2.3 | 2.7 |
| Physical properties | Viscosity of base material (mPa/s) | 12000 | 630 | 9980 | 9980 | 2500 | 2850 |
| | Viscosity of curing agent (mPa/s) | 20 | 20 | 18 | 250 | 20 | 20 |
| | Viscosity increase ratio of base material (%) | 0 | 0 | 0 | 0 | 0 | 124 |
| | Gelling time at 120° C. (s) | 96 | 136 | 149 | 125 | 101 | 37 |
| | Tg (° C.) | 149 | 98 | 138 | 146 | 138 | 125 |

INDUSTRIAL APPLICABILITY

The resin composition for fiber-reinforced composite materials according to the present invention has low viscosity, satisfactory impregnability into reinforcing fibers, and rapid curability, and provides a molded article having a high glass transition temperature by curing the composition. In particular, the resin composition for fiber-reinforced composite materials is suitable for obtaining a molded body by subjecting a fiber-reinforced composite material to a resin transfer molding method or a liquid compression molding method.

The invention claimed is:

1. A two-pack resin composition for fiber-reinforced composite materials comprising
a base material including an epoxy resin (A) and a (meth)acrylate compound (B) having three or more (meth)acryloyl groups in a molecule, and
a curing agent including an amine compound (C) represented by a following general formula (1), and
a curing catalyst that is at least one selected from phenol, hydroquinone, methylhydroquinone, dimethylhydroquinone, trimethylhydroquinone, tetramethylhydroquinone, isopropylhydroquinone, methyl-isopropylhydroquinone, mono-t-butylhydroquinone, mono-t-amylhydroquinone, nitrohydroquinone, phenylhydroquinone, chlorohydroquinone, dichlorohydroquinone, bromohydroquinone, catechol, t-butyl catechol, resorcinol, pyrogallol, dinitropyrogallol, and 1,2,4-benzenetriol,
a mass ratio of the base material to the curing agent being within the range of from 85:15 to 65:35, wherein the epoxy resin (A) includes 75% by mass to 100% by mass of a bisphenol A epoxy resin;

$$X-(CH_2NH_2)_n \quad (1)$$

wherein X represents an n-valent organic group having 1 to 16 carbon atoms; and n represents 2 or 3;
wherein a cured product obtained by curing the resin composition for fiber-reinforced composite materials by heating at 130° C. for 5 min has a glass transition temperature of 110° C. or higher.

2. The two-pack resin composition for fiber-reinforced composite materials according to claim 1, wherein the X in the general formula (1) is an n-valent hydrocarbon group having an alicyclic structure having 6 or more carbon atoms, an n-valent hydrocarbon group having an aromatic ring structure, or an aliphatic hydrocarbon group, and the alicyclic structure or the aliphatic hydrocarbon group may have a secondary amine structure inside thereof.

3. The two-pack resin composition for fiber-reinforced composite materials according to claim 1 or 2, wherein the amine compound (C) is a diamine represented by following formula (2) or (3);

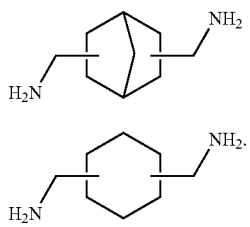

4. The two-pack resin composition for fiber-reinforced composite materials according to claim 1, wherein the (meth)acrylate compound (B) is at least one selected from the group consisting of trimethylolpropane tri(meth)acrylate, ditrimethylolpropane tetra(meth)acrylate, pentaerythritol tetra(meth)acrylate, and dipentaerythritol hexa(meth)acrylate.

5. The two-pack resin composition for fiber-reinforced composite materials according to claim 1, wherein the mass ratio of the epoxy resin (A) and the (meth)acrylate compound (B) in the base material is within the range of from 96:4 to 70:30.

6. The two-pack resin composition for fiber-reinforced composite materials according to claim 1, wherein the base material has a viscosity increase ratio of 16% or less after 24 hour-lapse at 60° C. under a vacuum degree of 1.0 kPa.

7. The two-pack resin composition for fiber-reinforced composite materials according to claim 1, wherein the X in the general formula (1) is an n-valent hydrocarbon group having an alicyclic structure having 6 or more carbon atoms or an aliphatic hydrocarbon group.

8. The two-pack resin composition for fiber-reinforced composite materials according to claim 1, wherein the curing catalyst is resorcinol or 4-tert-butylphenol.

9. A fiber-reinforced composite material in which reinforcing fibers are blended in the two-pack resin composition for fiber-reinforced composite materials according to claim 1.

10. The fiber-reinforced composite material according to claim 9, wherein a volume content ratio of the reinforcing fibers is 45% to 70%.

11. A cured product of the fiber-reinforced composite material according to claim 8 or 10.

12. A method for manufacturing a molded body comprising molding the fiber-reinforced composite material according to claim 9 or 10 by a resin transfer molding method or a liquid compression molding method.

13. A method for manufacturing a molded body comprising the steps of:

preparing a base material that includes an epoxy resin (A) including 75% by mass to 100% by mass of a bisphenol A epoxy resin and a (meth)acrylate compound (B) having three or more (meth)acryloyl groups in a molecule, and a curing agent including an amine compound (C) represented by the following general formula (1)

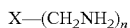

wherein X represents an n-valent organic group having 1 to 16 carbon atoms; and n represents 2 or 3, and a curing catalyst that is at least one selected from phenol, hydroquinone, methylhydroquinone, dimethylhydroquinone, trimethylhydroquinone, tetramethylhydroquinone, isopropylhydroquinone, methyl-isopropylhydroquinone, mono-t-butylhydroquinone, mono-t-amylhydroquinone, nitrohydroquinone, phenylhydroquinone, chlorohydroquinone, dichlorohydroquinone, bromohydroquinone, catechol, t-butyl catechol, resorcinol, pyrogallol, dinitropyrogallol, and 1,2,4-benzenetriol;

heating the base material to 50° C. to 90° C., heating the curing agent and curing catalyst to 20° C. to 60° C., and mixing the base material, the curing agent, and the curing catalyst such that the mass ratio of the base material and the curing agent is within the range of from 85:15 to 65:35;

blending reinforcing fibers therein to obtain a fiber-reinforced composite material; and thermally curing and molding the fiber-reinforced composite material in a die.

* * * * *